(12) United States Patent  
Zhang et al.

(10) Patent No.: US 7,930,890 B2  
(45) Date of Patent: Apr. 26, 2011

(54) METHOD FOR PROTECTING THE HOT GAS PARTS OF A GAS TURBINE INSTALLATION FROM OVERHEATING AND FOR DETECTING FLAME EXTINCTION IN THE COMBUSTION CHAMBER

(75) Inventors: Mengbin Zhang, Baden (CH); Tobias Spitzmueller, Ennetbaden (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/081,692

(22) Filed: Apr. 18, 2008

(65) Prior Publication Data

US 2008/0229746 A1  Sep. 25, 2008

Related U.S. Application Data

(63) Continuation of application No. PCT/EP2006/066191, filed on Sep. 8, 2006.

(30) Foreign Application Priority Data

Oct. 18, 2005 (CH) .................................. 1678/05

(51) Int. Cl.  
*F02C 1/00* (2006.01)

(52) U.S. Cl. ........................................ 60/772

(58) Field of Classification Search ............ 60/39.091, 60/39.281, 772, 779  
See application file for complete search history.

(56) References Cited

U.S. PATENT DOCUMENTS

| 3,611,282 | A | * | 10/1971 | Hill | .................. | 340/963 |
| 3,830,055 | A | | 8/1974 | Erlund | | |
| 4,655,041 | A | | 4/1987 | Del Vecchio et al. | | |
| 4,744,670 | A | | 5/1988 | Janssen | | |
| 5,544,478 | A | * | 8/1996 | Shu et al. | .................. | 60/773 |
| 5,581,992 | A | * | 12/1996 | Borouchov | .................. | 59/29 |
| 5,665,916 | A | * | 9/1997 | Puster et al. | .................. | 73/590 |

(Continued)

FOREIGN PATENT DOCUMENTS

DE  1 601 556 A1  2/1970

(Continued)

OTHER PUBLICATIONS

PCT/ISA/210—International Search Report.

(Continued)

*Primary Examiner* — William H Rodriguez  
*Assistant Examiner* — Phutthiwat Wongwian  
(74) *Attorney, Agent, or Firm* — Buchanan Ingersoll & Rooney PC

(57) ABSTRACT

A method for protecting a gas turbine installation from overheating and for detecting flame extinction in the combustion chamber is described, in which air is compressed in a compressor unit and, after being admixed with fuel, is ignited in the form of a fuel/air mixture in a combustion chamber and is burnt, thus giving rise to a hot gas flow which sets a turbine stage in rotation downstream of the combustion chamber so as to perform expansion work. The pressure upstream of the turbine stage, that is the pressure $p_k$ of the compressed air in the plenum and/or the pressure within the combustion chamber $p_{com}$, is measured, in that a time change of the measured pressure, what is known as the pressure gradient ($\dot{p}$), is determined, in that at least one threshold value is selected, and in that the pressure gradient or a variable derived from the pressure gradient is compared with the at least one threshold value and, if the threshold value is overshot or undershot, a signal is generated.

14 Claims, 2 Drawing Sheets

U.S. PATENT DOCUMENTS

| | | | |
|---|---|---|---|
| 5,706,643 A * | 1/1998 | Snyder et al. | 60/776 |
| 2004/0255595 A1 | 12/2004 | Morgan et al. | |
| 2006/0137353 A1 * | 6/2006 | Lieuwen et al. | 60/772 |
| 2006/0248893 A1 * | 11/2006 | Mick et al. | 60/772 |

FOREIGN PATENT DOCUMENTS

| | | |
|---|---|---|
| DE | 27 39 434 A1 | 3/1978 |
| DE | 28 50 625 A1 | 6/1979 |
| EP | 0 774 573 A2 | 5/1997 |
| EP | 1 231 369 A2 | 8/2002 |
| EP | 1 327 824 A1 | 7/2003 |
| EP | 1 531 243 A2 | 5/2005 |
| WO | WO 96/28644 A1 | 9/1996 |

OTHER PUBLICATIONS

PCT/ISA/237—Written Opinion.
PCT/ISA/210—Swiss Search Report.

* cited by examiner ated on Oct. 18, 2005, and as a continuation application under 35 U.S.C. §120 to PCT/EP2006/066191 filed as an International Application on Sep. 8, 2006 designating the U.S., the entire contents of which are hereby incorporated by reference in their entireties.

TECHNICAL FIELD

A method for protecting a gas turbine installation from overheating and for detecting flame extinction in the combustion chamber is disclosed, in which air is compressed in a compressor unit and, after being admixed with fuel, is ignited in the form of a fuel/air mixture in a combustion chamber and is burnt, thus giving rise to a hot gas flow which sets a turbine stage in rotation downstream of the combustion chamber so as to perform expansion work.

BACKGROUND INFORMATION

Modern gas turbine installations used for generating electrical energy are power-optimized systems, the individual components of which are mostly operated at their material-related roadability limits, such as, in particular, those components which are exposed directly to the hot gas stream occurring within the combustion chamber during the combustion process. These are, in particular, the guide vanes and moving blades of the gas turbine stage, within which the hot gases emerging from the combustion chamber at maximum temperatures of above 1000° C. perform expansion work which drive the rotor unit which is ultimately connected to a generator for generating electrical energy. In order to ensure that the gas turbine components exposed to the hot gases do not overheat, care must be taken to ensure that what is known as a maximum permissible operating temperature limit dependent on the respective gas turbine type is not overshot.

For this purpose, the turbine outlet temperature (TAT) can be measured, and the turbine inlet temperature (TET) can be determined via suitable auxiliary variables. During normal operation, the latter is kept below a specific limit value by means of appropriate control actions, in order to prevent guide vanes and moving blades from overheating.

If this limit value is nevertheless overshot on account of a fault, the components which are exposed directly to the hot gas stream are subjected to excessive thermal stress, with the result that the useful life of the overall gas turbine installation may ultimately be reduced considerably.

In order to avoid an overheating of the gas turbine installation, the hot gas temperature before inlet into the gas turbine stage has been monitored continuously. In the event of an approach of the hot gas temperature to the maximum limit temperature, measures have been taken in order to avoid a further temperature rise, for example in the form of an emergency shutdown of the gas turbine installation by the supply of fuel being stopped abruptly.

To measure the turbine outlet temperature, thermocouples are mostly used which, due to the system, are subject to measurement inertia with time constants in the second range.

If the temperature rise of the hot gases occurs sufficiently slowly, thermal sensors can detect in good time an approach to the maximum limit temperature, and therefore appropriate countermeasures can be initiated sufficiently early. If, however, an overheating of the hot gases takes place abruptly and suddenly, for example within fractions of a second, then there are problems in detecting the overheating event in good time by means of known thermal sensors. For this reason, it is appropriate to look for alternative protection and monitoring systems, with the aid of which an overheating of gas turbine installations can be ruled out reliably.

Furthermore, for an exemplary operation of the gas turbine installation, it can be desirable to ensure that the fuel supplied is burnt completely within the combustion chamber. Modern combustion systems are in this case operated with low flame temperatures very close to the extinction limit in order to minimize the emissions of nitrogen oxides. In the event of a fault which leads to a lowering of the flame temperature below a critical limit value, the combustion reaction can no longer be maintained, and therefore the flame is extinguished completely or partially. If fuel continues to be supplied in such a case, this may lead to hazardous situations if the fuel/air mixture ignites downstream of the combustion chamber, for example in a boiler installation coupled to the gas turbine.

For this reason, the operation of the combustion chamber can be monitored. This can be carried out with the aid of optical sensors which detect specific flame parameters via a photocell and compare them with defined limit values. If the parameters are outside the permitted operating window, the emergency shutdown is triggered.

However, the treatment and evaluation of the measured flame parameters can involve a certain processing time which can be in the region of 1 sec in present-day systems. Moreover, reliable detection may not always ensured if the flame is not extinguished completely, but only partially. The latter, however, may likewise lead to potential damage to the installation, for example if fuel metering is increased on account of the power drop of the gas turbine, which occurs in the event of a partial extinction of the flame, and if the flame thereupon reignites completely again.

There is therefore a desire for supplementary measures for optical flame monitoring which can compensate these deficiencies.

SUMMARY

Figure 1:
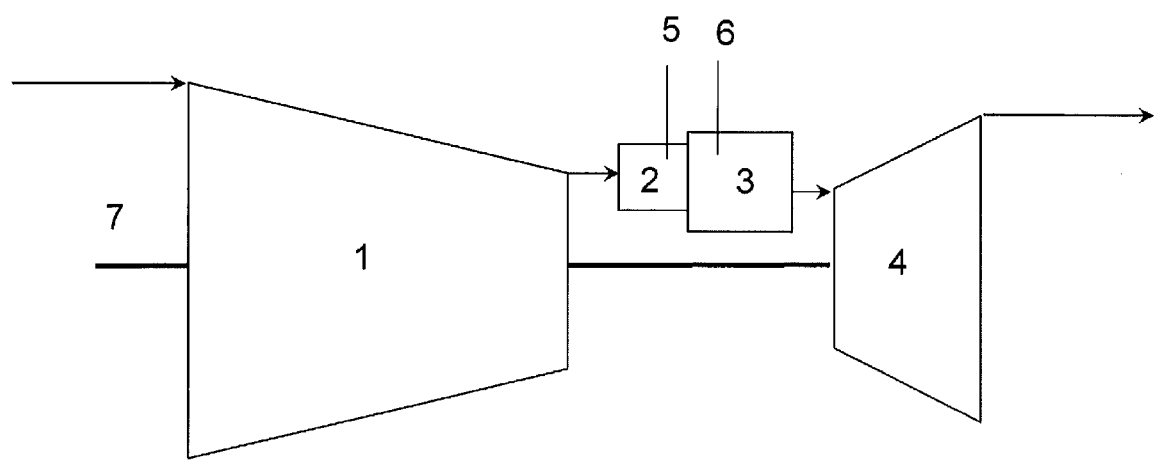
FIG. 1 is a schematic of an exemplary gas turbine installation.
Figure 2:
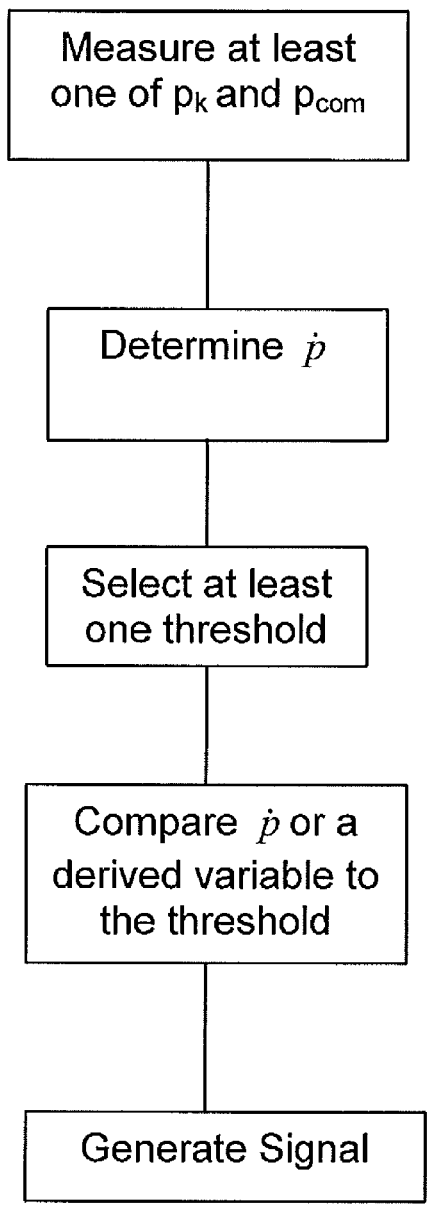
FIG. 2 is a flow chart of an exemplary method of protecting a gas turbine installation.

A method is disclosed for protecting a gas turbine installation from overheating and for detecting a flame extinction in the combustion chamber 3, in which air is compressed in a compressor unit 1 and, after being admixed with fuel, is ignited as a fuel/air mixture in a combustion chamber 3 and is burnt, to create a hot gas flow which sets a turbine stage 4 in rotation downstream of the combustion chamber 3 comprising measuring upstream of the turbine stage 4, pressure $p_k$ 5 of compressed air in a plenum 2 and/or pressure $p_{com}$ 6 within the combustion chamber 3; determining a time change of the measured pressure as a pressure gradient ($\dot{p}$); selecting at least one threshold value; comparing the pressure gradient or a variable derived from the pressure gradient with the at least one threshold value; and generating a signal when the threshold value is overshot or undershot by the pressure gradient or the variable.

DETAILED DESCRIPTION

A method is disclosed wherein the pressure upstream of the turbine stage 4 is measured, this being the pressure in the combustion chamber 3 or in the plenum 2 upstream of the combustion chamber 3. Subsequently, the time change of the measured pressure, what is known as the pressure gradient, is determined. Furthermore, a threshold value is fixed, which is preferably to be selected as a function of the gas turbine and which is compared with the pressure gradient or with a variable derived from the pressure gradient. If the determined pressure gradient and/or the variable derived from the pressure gradient overshoot/overshoots the threshold value, a signal is generated which typically leads to the emergency shutdown of the gas turbine installation.

An idea according to the disclosure is based on the consideration that with the increase or lowering of the hot gas temperature accompanied by a fuel quantity change, a change in the turbine counterpressure is also induced in parallel.

Since the pressure change can be detected more quickly by measurement than a temperature change, it is appropriate for deriving an additional protective function against overheating in the event of a very rapid and sharp hot gas temperature increase. Moreover, the extinction of the flame can be detected quickly via such a function, since this corresponds to a hot gas temperature plunge and therefore to a corresponding drop in the turbine counterpressure.

In physical terms, however, the counterpressure of the turbine stage of a gas turbine does not depend solely on the firing level, but also on the air mass flow flowing through it.

Modern gas turbines are conventionally equipped with one or more adjustable compressor guide vane cascades which make it possible to modulate the compressor intake mass flow over the operating range of the installation.

So that the pressure change caused by too high or too low a hot gas temperature can be separated from a pressure change caused by the air mass flow, the latter must be compensated by means of suitable measures. This is carried out typically, using the preliminary guide vane cascade position, the shaft rotational speed and the ambient pressure and ambient temperature, in a suitable correcting function.

In a design variant of the method disclosed herein, on the measurement of the pressure $p_{com}$ prevailing within the combustion chamber, compensated by the abovementioned correcting function, the time change of the measured pressure, the pressure gradient $\dot{p}_{com}$, is determined. If the pressure gradient determined in this way overshoots or undershoots a predetermined positive or negative threshold value, a signal is generated which leads to an emergency shutdown, that is to say a rapid cut-off of the fuel supply, of the gas turbine installation.

An extended design variant of the method provides for integrating the determined pressure gradient over a variably predeterminable time window, so that any brief faults in the measurement chain do not lead to an erroneous emergency shutdown. In this case, the start and end time points of the time window within which the determined and corrected pressure gradient is integrated are determined by the behavior of the currently determined pressure gradient itself in each case. The integration is triggered in so far as the currently determined pressure gradient overshoots a predetermined desired start pressure gradient value. The integration time or the time window within which the pressure gradient is integrated ends at an end time point which is set in that case, in so far as the currently determined pressure gradient undershoots a predetermined upper end pressure gradient value. The integral pressure gradient obtained in this way, also designated as an increment, is likewise compared with a threshold value which, when overshot, leads to the abovementioned signal which induces the emergency shutdown of the gas turbine installation.

Exemplary methods disclosed herein can be employed not only in gas turbine installations with a single combustion chamber, but also in gas turbine installations with sequential combustion, the pressures upstream of the respective turbine stages being detected separately and being evaluated in the way described.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for protecting a gas turbine installation from overheating and for detecting a flame extinction in a combustion chamber, in which air is compressed in a compressor unit and, after being admixed with fuel, is ignited as a fuel/air mixture in the combustion chamber and is burnt, to create a hot gas flow which sets a turbine stage in rotation downstream of the combustion chamber comprising:

measuring, upstream of the turbine stage, at least one of pressure $p_k$ of compressed air in a plenum and pressure $p_{com}$ within the combustion chamber;

determining a time change of the measured pressure as a pressure gradient (p');

determining a variable derived from the pressure gradient by integration of the determined pressure gradient within a time window of variable integration duration;

determining the time window by a start and an end time point;

defining the start and the end time point by the determined pressure gradient;

triggering the start time point when a desired start pressure gradient is overshot by the determined pressure gradient;

setting the end time point when an end pressure gradient is undershot;

selecting a maximum positive or minimum negative integral value as a threshold value by the pressure gradient;

comparing the variable derived from the pressure gradient with the threshold value and;

generating a signal when the maximum positive threshold value is overshot or the minimum negative threshold value is undershot by an increment value which is obtained by the integration of the determined pressure gradient within the time window.

2. The method as claimed in claim 1, comprising:

cutting off a fuel supply of the combustion chamber as an emergency shutdown of the gas turbine installation in response to the signal.

3. The method as claimed in claim 1 for protecting a gas turbine installation with sequential combustion having a plurality of combustion chambers with interposed turbine stages in each case, comprising, for each turbine stage:

measuring, upstream of the turbine stage, at least one of pressure $p_k$ of compressed air in a plenum and pressure $p_{com}$ within the combustion chamber;

determining a time change of the measured pressure as a pressure gradient (p');

determining a variable derived from the pressure gradient by integration of the determined pressure gradient within a time window of variable integration duration;

determining the time window by a start and an end time point;

defining the start and the end time point by the determined pressure gradient;

triggering the start time point when a desired start pressure gradient is overshot by the determined pressure gradient;

setting the end time point when an end pressure gradient is undershot;

selecting a maximum positive or minimum negative integral value as a threshold value by the pressure gradient;

comparing the variable derived from the pressure gradient with the threshold value and;

generating a signal when the maximum positive threshold value is overshot or the minimum negative threshold value is undershot by an increment value which is obtained by the integration of the determined pressure gradient within the time window.

4. The method as claimed in claim 1, comprising:
detecting a partial or complete flame extinction in the combustion chamber, by using a negative pressure change which undershoots a negative threshold value after evaluation as a criterion.

5. The method as claimed in claim 1, comprising:
cutting off a fuel supply of the combustion chamber as an emergency shutdown of the gas turbine installation in response to the signal.

6. The method as claimed in claim 5 for protecting a gas turbine installation with sequential combustion having a plurality of combustion chambers with interposed turbine stages in each case, comprising, for each turbine stage:

measuring, upstream of the turbine stage, at least one of pressure $p_k$ of compressed air in a plenum and pressure $p_{com}$ within the combustion chamber;

determining a time change of the measured pressure as a pressure gradient (p');

determining a variable derived from the pressure gradient by integration of the determined pressure gradient within a time window of variable integration duration;

determining the time window by a start and an end time point;

defining the start and the end time point by the determined pressure gradient;

triggering the start time point when a desired start pressure gradient is overshot by the determined pressure gradient;

setting the end time point when an end pressure gradient is undershot;

selecting a maximum positive or minimum negative integral value as a threshold value by the pressure gradient;

comparing the variable derived from the pressure gradient with the threshold value and;

generating a signal when the maximum positive threshold value is overshot or the minimum negative threshold value is undershot by an increment value which is obtained by the integration of the determined pressure gradient within the time window.

7. The method as claimed in claim 6, comprising:
detecting a partial or complete flame extinction in the combustion chamber by using a negative pressure change which undershoots a negative threshold value after evaluation as a criterion.

8. A method for protecting a gas turbine installation from overheating and for detecting a flame extinction in a combustion chamber, in which air is compressed in a compressor unit and, after being admixed with fuel, is ignited as a fuel/air mixture in the combustion chamber and is burnt, to create a hot gas flow which sets a turbine stage in rotation downstream of the combustion chamber comprising:

measuring, upstream of the turbine stage, pressure $p_{com}$ within the combustion chamber;

measuring air mass flow to determine a correcting function and applying the correcting function to $p_{com}$ determining a time change of the measured pressure, corrected by the correcting function, as a pressure gradient ($\dot{p}$);

selecting at least one threshold value;

comparing the pressure gradient or a variable derived from the pressure gradient with the at least one threshold value; and generating a signal in response to the threshold value being overshot or undershot by the pressure gradient or the variable.

9. The method as claimed in claim 8, comprising:
determining the variable derived from the pressure gradient by integration of the determined pressure gradient within a time window of variable integration duration.

10. The method as claimed in claim 9, comprising:
determining the time window by a start and an end time point; and defining the start and the end time point by the determined pressure gradient.

11. The method as claimed in claim 10, comprising:
triggering the start time point when a desired start pressure gradient is overshot by the determined pressure gradient; and setting the end time point when an end pressure gradient is undershot.

12. The method as claimed in claim 11, comprising:
selecting a maximum positive or minimum negative integral value as a threshold value by the pressure gradient, and generating the signal when the maximum positive threshold value is overshot or the minimum negative threshold value is undershot by an increment value which is obtained by the integration of the determined pressure gradient within the time window.

13. The method as claimed in claim 9, comprising:
selecting a maximum positive or minimum negative integral value as a threshold value by the pressure gradient; and generating the signal when the maximum positive threshold value is overshot or the minimum negative threshold value is undershot by an increment value which is obtained by the integration of the determined pressure gradient within the time window.

14. The method as claimed in claim 8 comprising:
measuring air mass flow by determining a change in preliminary guide vane position and a change in shaft rotational speed and determining an ambient pressure and ambient temperature.

\* \* \* \* \*